United States Patent
Sidbeck et al.

[11] 3,819,902
[45] June 25, 1974

[54] PATTERN WELDING CONTROL DEVICE

[75] Inventors: Paul R. Sidbeck, Torrance; Daniel S. Weinstein, Palos Verdes Peninsula, both of Calif.

[73] Assignee: North America Rockwell Corporation, El Segundo, Calif.

[22] Filed: June 8, 1973

[21] Appl. No.: 368,543

Related U.S. Application Data

[62] Division of Ser. No. 185,995, Oct. 4, 1971, abandoned.

[52] U.S. Cl. ............... 219/125 PL, 219/137, 228/9, 318/577
[51] Int. Cl. ............................................. B23k 9/00
[58] Field of Search ..... 219/124, 125, 137, 121 EB; 318/577; 228/9

[56] References Cited
UNITED STATES PATENTS

| | | | |
|---|---|---|---|
| 2,994,763 | 8/1961 | Schultz | 219/123 |
| 3,017,496 | 1/1962 | Greene | 219/124 |
| 3,299,250 | 1/1967 | Vilkas et al. | 219/124 |
| 3,551,637 | 12/1970 | Lampson | 219/123 |

FOREIGN PATENTS OR APPLICATIONS
| | | | |
|---|---|---|---|
| 901,203 | 7/1962 | Great Britain | 219/125 |

*Primary Examiner*—J. V. Truhe
*Assistant Examiner*—Clifford C. Shaw
*Attorney, Agent, or Firm*—Charles T. Silberberg; L. Lee Humphries

[57] ABSTRACT

An arc-seam welding procedure to join two thin sheets in 'T' relationship wherein two infrared sensors disposed on opposite sides of the vertical member detect any welding puddle heat unbalance from the underside. An unbalance signal from the sensors moves the welding heat source transversely across the puddle during its progressive movement along the joint, to restore the heat balance on the other side of the joint. The arangement avoids the need for costly chill bars, and is especially suitable where the vertical member is corrugated or sinusoidal in plan view.

15 Claims, 8 Drawing Figures

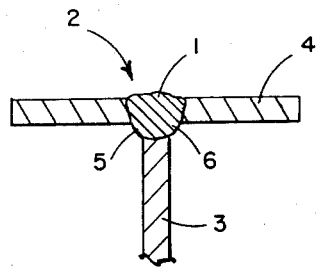
FIG. IA
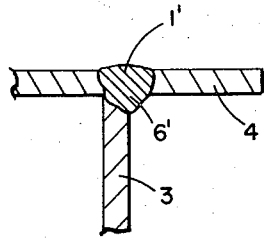
FIG. IB
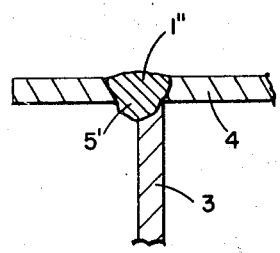
FIG. IC
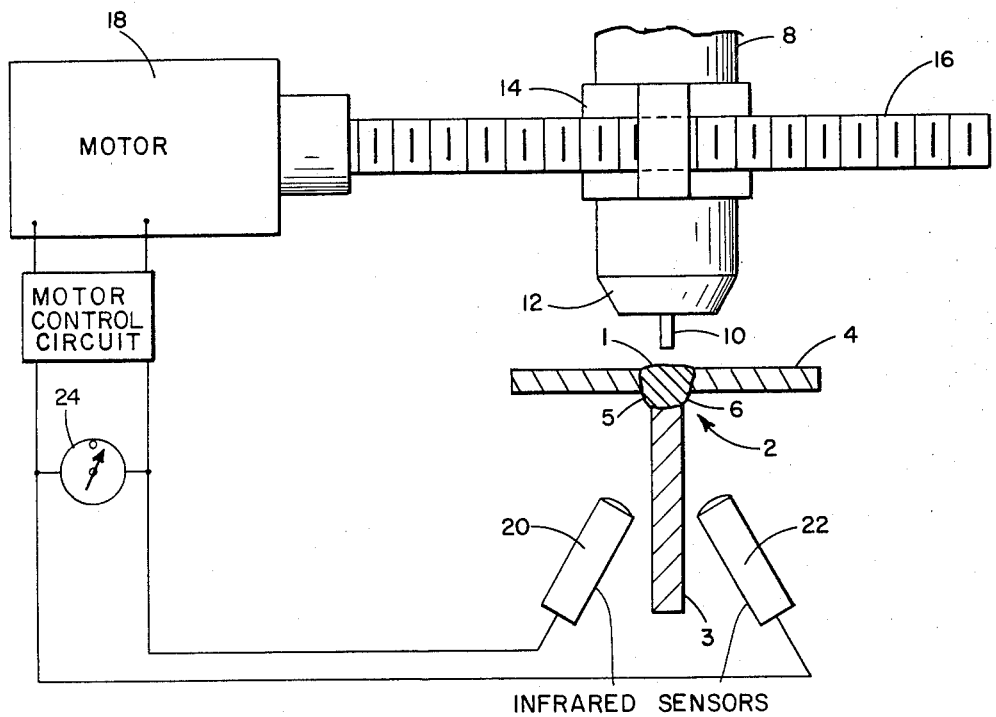
FIG. 2

PATTERN WELDING CONTROL DEVICE

This is a division of application Ser. No. 185,995 filed Oct. 4, 1971, now abandoned.

BACKGROUND OF THE INVENTION

In the construction of aerospace vehicles such as airplanes and rockets, requiring minimization of component weights, it is widespread practice to weld thin sheet metal structural shapes. Arc-seam welding of sine-wave spars and the like as practiced in the prior art requires elaborate and very expensive tooling. Harrison, in U.S. Pat. No. 3,012,130, teaches joining of two or more metal members in a T relationship by arc welding in which the ratio of the masses of the joined members can be 16 to 1. When one of these joined members has a contoured pattern, chill bars having contours closely matching the workpiece contours must be used to conduct heat directly away from the weld seam in order to reduce residual stress and consequent distortion in the workpiece members.

Vilkas, in U. S. Pat. No. 3,299,250, discloses the use of an optical sensor in an automatic welding system to control welding heat and penetration. A single photocell senses the radiation from the heated workpiece and provides feedback through an electrical system control voltage, to control the current supplied to the welding arc, as the workpiece is moved through the fixed position of the welding electrode and the sensing photocell combination.

In Normando, U. S. Pat. No. 3,370,151, a single radiant energy optical scanner is disposed in a fixed converging relationship with a wleding head, both components being arranged to move horizontally along one side of a workpiece. The temperature profile along the line of travel, which forms the weld bead, is successively scanned by the sensor, generating a train of electrical pulses indicative of the temperature profile in and around the weld bead. The electrical output from the infrared scanner and the combined electrical circuitry measures the variation of the continuously formed bead width. The control output of the electrical circuit can be used to vary welding machine parameters, such as the speed of electrode travel along the weld bead or the welding current, to maintain a substantially constant width weld bead and the like.

Sidbeck, in U. S. Pat. No. 3,341,686, teaches a method and means for adding welding wire to a molten weld puddle at a variable rate by varying the speed of a wire feed motor in response to changes in arc voltage, which can also be done in the process disclosed herein.

Erickson, in U. S. Pat. No. 3,191,441, discloses a welding apparatus utilizing the time-temperature integral of the weld heat-pulse as a criterion of the weld quality. A single infrared detector, sensitive to the required radiation range, is used to detect and through appropriate electronic circuitry to yield an output voltage level representative of the weld time-temperature integral. By performing a plurality of welds at various weld schedules and monitoring the weld time-temperature integral, the integral necessary to produce optimum weld strength can be established. This time-temperature value can then be entered into the welding schedule as a design limit for the minimum acceptable welding criterion.

None of the above cited art discloses or teaches an infrared optical balance disposed about a T configured workpiece joint to maintain substantially equal fillet size, or as a tracking means for a weld torch in such workpiece configuration.

SUMMARY OF THE INVENTION

A process and a welding control device are taught for joining together two relatively thin metal members by progressively fusion welding them in a simulated T beam relationship, the edge of a first member being joined to a surface of a second member. The first metal member, whose thin edge is joined substantially normal to a surface of the second metal member, can have a contoured pattern such as sinusoidal form or the like. In the welding control device, the heat sensor balance has at least one pair of heat sensors symmetrically disposed on each side of the first straight or contoured pattern metal member, with each one of the pair of sensors cooperatively pointing at the location of the proposed weld fusion joint from the underside thereof. On fusing the metal of the workpieces at the proposed joint, each symmetrically disposed sensor generates a balanced equivalent electrical signal, if the fillets of the two fused surfaces are symmetrical on both sides of the T joint. An unbalanced fillet configuration causes an unbalance signal from the pair of oppositely disposed sensors which is fed through electromechanical bridge balancing means, to move the welding torch laterally toward one side of the weld joint as required to maintain an equal heat balance between the fillets formed by the weld puddle. An automatic drive moves the welding torch progressively along the weld path from one end to the other of the workpiece components to join the same in a single weld pass. Further actuated by an electrical signal from the optical balance, the welding torch traverses the straight channel or contour pattern of the first metal member, providing automatic welding to the T joint relationship. The welding torch and the heat sensors are mounted on a common supporting frame for simultaneous movement along the welding path. While the torch is movable transversely across the weld joint when an unbalanced condition is sensed, the sensors normally move in a parallel linear path and need not move transversely even if the vertical workpiece member is sinusoidal in form, however for certain types of large weldments it may be desirable or necessary to have the sensors transversely movable.

BRIEF DESCRIPTION OF THE DRAWINGS

FIG. 1a, 1b and 1c are schematic elevation views of simulated T joints in sectional views, illustrating the optimum placement of the weld fillets and typical misplaced weld fillets which can be formed in a fusion welding process.

FIG. 2 is a side elevation schematic view of the heat balance control useful in the process taught in this case.

DESCRIPTION OF THE PREFERRED EMBODIMENT

Figure 3:
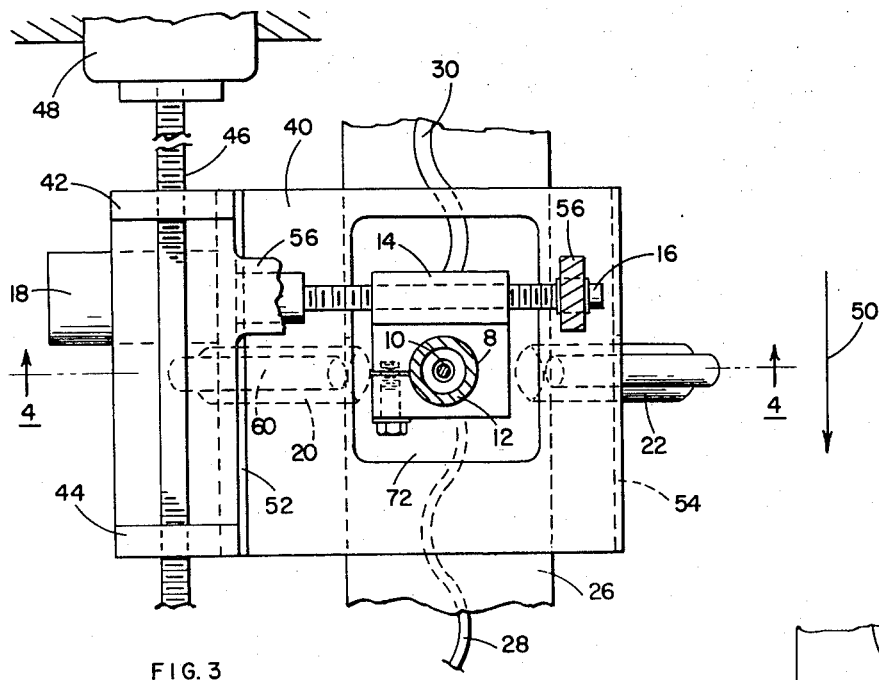
FIG. 3 is a plan view of the heat balance controlled welding device seen in FIG. 2.

Welding of thin gauge sheet metal members present formidable problems not heretofore encountered in the welding art. As in welding generally, the weld puddle temperature is normally raised much higher than the melting point of the base metal, and some welding heat diffuses into the surrounding base metal. Changes such as expansion and shrinkage of the heat affected area normally result from the welding operation. In the welding of complicated workpieces having contour patterns, the misalignment of the weld fillet can produce further stress and decrease the optimum strength of the bond. FIG. 1a sectionally illustrates the optimum position of the weld bead 1 in a channel or simulated T configured workpiece 2 comprising a first member 3 joined to a second member 4. In the burnthrough welding process which is taught by U.S. Pat. No. 3,012,130, the weld nugget 1 is formed in a single pass by applying welding heat to the surface of member 4 opposite from the surface contacted by an edge of member 3. FIG. 1b illustrates the degraded strength weld bead 1' displaced from a symmetrical position in respect to the cross-sectional thickness of workpiece member 3. FIG. 1c illustrates a similar misaligned condition of weld nugget 1'' in the opposite direction from FIG. 1b.

FIG. 2 shows a schematic view of welding apparatus incorporating the inventive principles disclosed herein to form a welded joint having symmetrical fillets such as suggested by fillets 5 and 6 in FIG. 1a. The source of welding heat as seen in FIG. 2 comprises welding torch 8 containing tungsten electrode 10 and surrounded by a ceramic gas cup 12 all of which are known to the prior art. Arc-seam welding, as suggested in mentioned U.S. Pat. No. 3,012,130, involves initial preplacement of workpiece components 3 and 4. In their desired final relationship with an edge of component 3 contacting a surface of component 4, and supporting the same in this relationship by suitable means (not shown) during the fusion welding thereof. Welding is accomplished by an arc between electrode 10 and workpiece component 4 which applies heat penetrating through the total thickness of member 4 and melting the stated edge of member 3. Torch 8 is secured by supporting means such as bracket 14 to a mechanical lead screw 16. The lead screw is rotatable about a longitudinal axis through the center thereof by connection with reversible drive means which may take any suitable form known to the prior art such as reversible electric motor 18. It will be understood from the foregoing that operation of motor 18 in either of two opposite rotational directions will result in corresponding rotation of lead screw 16, and this turn will cause translational movement of bracket 14 and torch 8 secured thereto toward the left or toward the right in the view shown by FIG. 2, depending upon the direction of such rotation. With electrode 10 centered directly over the contacting area between workpiece components 3 and 4, substantially in vertical alignment with workpiece component 3, a symmetrical weld nugget 1 such as shown in FIGS. 1a and 2 will normally result. When electrode 10 is misaligned toward the left in FIG. 2, the resulting nugget or weld seam 1'' shown in FIG. 1c may be expected to occur whereby a single fillet 5' is produced on one side of component 3 and no fillet is found on the opposite side thereof.

Motor 18 receives an electrical signal as required to translate torch 8 in a direction transverse to the weld seam 1 shown in cross-section in FIG. 2. The amount and direction of the electrical signal applied to motor 18 determines the amount and direction of rotation of lead screw 16 and the consequent amount and direction of movement of bracket 14 and torch 8. The signal thus applied to motor 18 is initiated through suitable electrical controls and circuitry discussed in greater detail below, but is initiated by the cooperative operation of two or more heat sensors such as infrared sensors 20 and 22. The novel method and apparatus disclosed herein have been very successfully practiced using two planar silicon photo-darlington amplifier light sensors positioned in the manner of sensors 20 and 22 in FIG. 2. Illustratively, other forms or types of sensor could be adapted to perform the necessary function in this case such as silicon phototransistors, silicon photodiodes, selenium photocells, cadmium sulfide photoconductive cells, vacuum photodiodes, thermistors, radiation thermometers and the like. In the preferred embodiment discussed herein, sensors 20 and 22 will be illustratively described as planar silicon photo-darlington amplifier light sensors and are positioned on opposite sides of vertical workpiece component 3 and below component 4. The sensors are directed toward weld nugget 1 and are separated by component 3 which forms a barrier therebetween. When thus arranged, sensor 20 provides an electrical signal which varies according to the amount of heat radiated by fillet 5, while sensor 22 provides a similar signal which will vary in response to the amount of heat radiated by fillet 6. When equal radiation is sensed by both elements 20 and 22, the electrical signals originating from both sensors will be substantially equal and motor 18 will remain stationary. If for any reason electrode 10 is displaced relative to its normal position of alignment over vertical workpiece component 3, such as resulting in a weld seam 1' or 1'' as shown in FIGS. 1b and 1c, respectively, unbalanced signals from elements 20 and 22 will be produced. A comparison of the two signals thus produced is achieved by use of suitable circuitry and controls discussed in greater detail below, whereby motor 18 is operated in the direction required to move torch 8 toward the left or right as required to restore the symmetrical pattern suggested in FIG. 2 whereby fillets 5 and 6 are substantially equal. Calibration means of any suitable form are preferably included in the circuitry between motor 18 and sensors 20, 22. To adjust the output of the sensors whereby equal signals are obtained when fillets 5 and 6 are substantially equal in size and heat intensity on either side of workpiece component 3, as suggested schematically by variable bridge circuit 24 in FIG. 2.

While a wide variety of different commercially available sensors are known to the prior art and can be used for elements 20 and 22, the sensors in this case can illustratively consist of a suitable commercial type such as produced by General Electric and referred to as a Planar Silicon Photo-Darlington Amplifier No. 2N5780. In any particular case, it is naturally desirable to select a pair of sensors having substantially similar operating characteristics, particularly with regard to output signal and response characteristics in respect of a given amount of heat radiation and distance therefrom.

Figure 4:
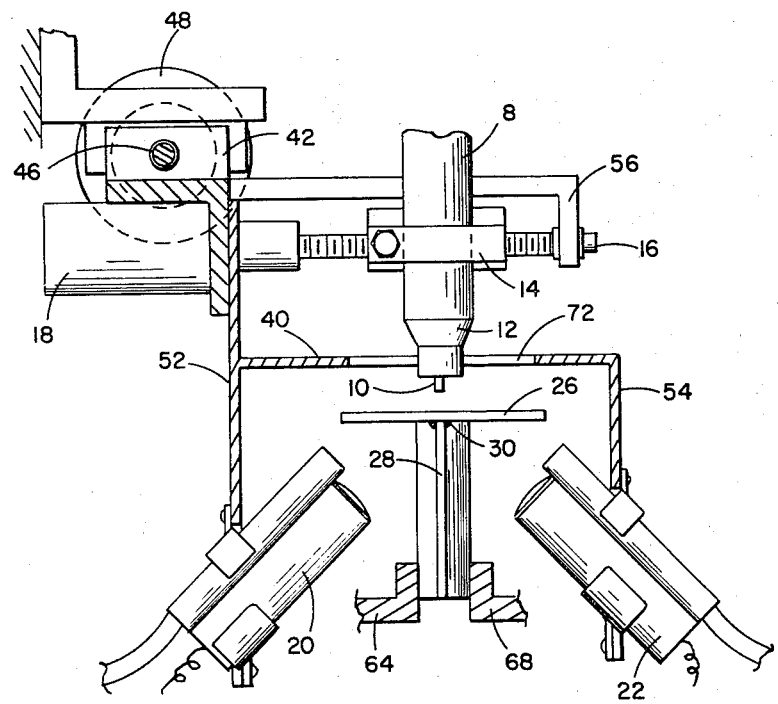
FIG. 4 is a side elevation illustrating a welding device conforming to the schematic showing of FIG. 1.
Figure 5:
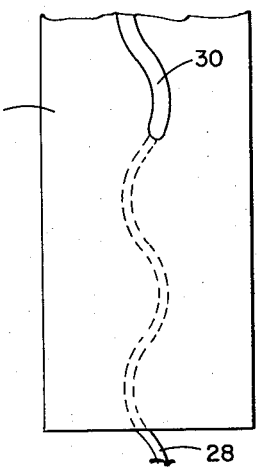
FIG. 5 is a plan view of a workpiece weldment such as illustrated in FIGS. 3 and 4.
Figure 6:
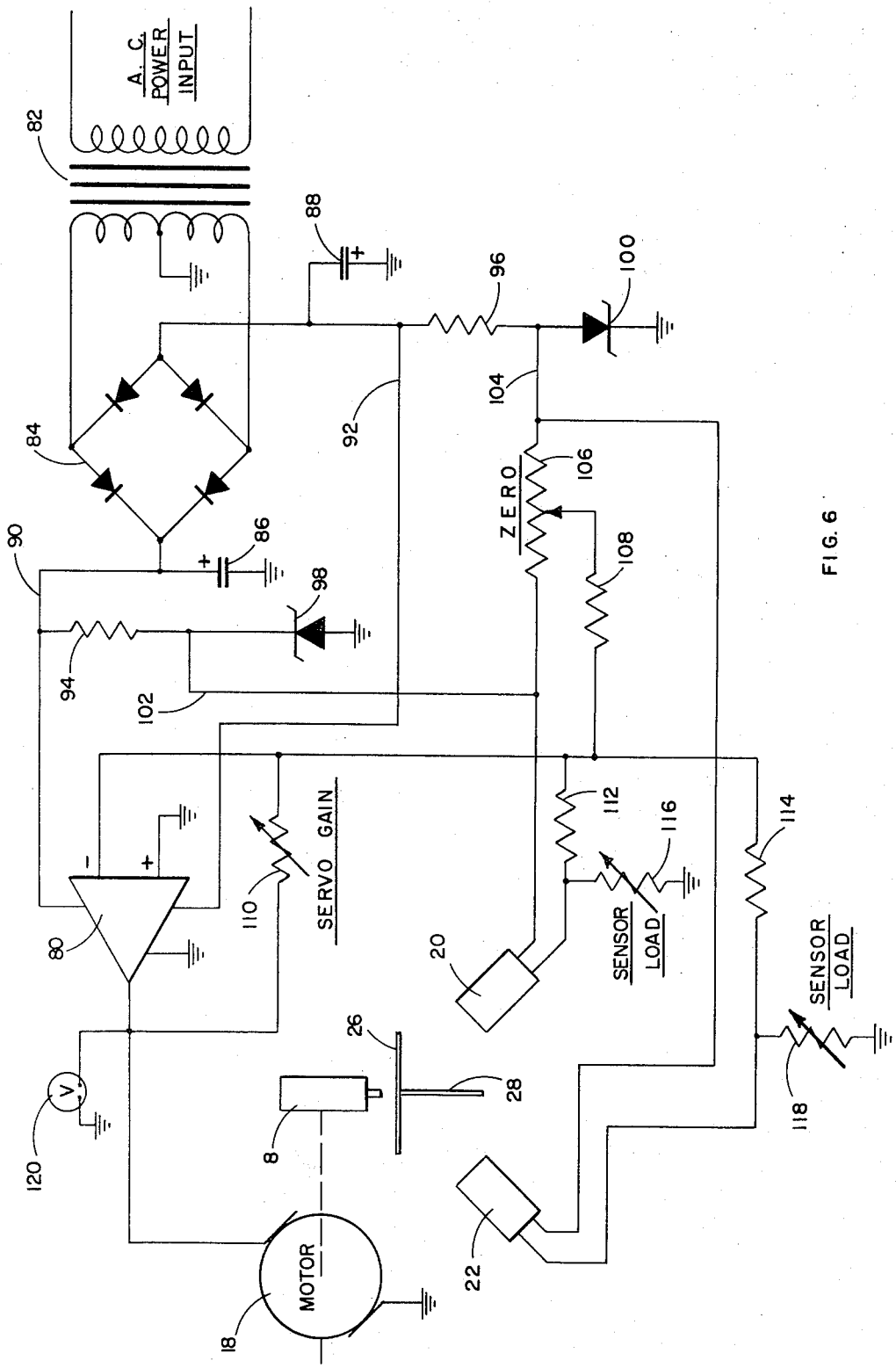
FIG. 6 is a schematic view of circuitry adapted for use with the structure shown in FIGS. 2 through 4.

Apparatus incorporating the inventive principles suggested schematically in FIG. 2 is shown more particularly in FIGS. 3 and 4. Referring particularly to FIG. 4, horizontal workpiece component 26 is of relatively thin sheet or plate form corresponding to workpiece component 4 in FIG. 1a, while vertical workpiece component 28 is of sinusiodal wave form as seen more clearly in FIGS. 3 and 5. Operation of the apparatus thus shown in FIGS. 3 and 4 will be described in connection with joindure of components 26 and 28 by fusion welding involving the arc-seam technique mentioned above. It will be understood that the weld seam suggested by the cross-sectional area 30 in FIG. 4 will require movement of electrode 10 along a welding path substantially corresponding with the contact area between the two stated workpiece components and denoted particularly by dotted lines in FIG. 3. In providing for the necessary movement of torch 8 relative to stationary workpiece members 26 and 28, a supporting frame 40 is provided having brackets 42 and 44 secured thereon and threadably engaging a lead screw 46 rotationally connected to suitable drive means such as electric motor 48. Electric motor 48, when operated during welding causes linear movement of supporting frame 40 and the components mounted thereon at a substantially uniform rate in the direction indicated by arrow 50 in FIG. 3.

As seen from FIG. 4, frame 40 has a pair of downwardly depending supports 52 and 54 secured thereto and movable therewith. Motor 18 shown schematically in FIG. 2 is affixed to support 52 on frame 40, while lead screw 16 rotationally connected to motor 18 is also supported on frame 40 and journalled for rotation relative thereto by suitable means such as flange 56 secured to the frame. Sensors 20 and 22 discussed above in connection with FIG. 2 may be seen FIG. 4 and are affixed to supports 52 and 54 of frame 40 in stationary relationship therewith. Separate support means such as vise jaws 64 and 68 seen in FIG. 4 support the workpiece components during the welding operation and hold the same in stationary relationship at all times. Movement of torch 8 in the direction denoted by arrow 50 in FIG. 3 due to operation of motor 48 and rotation of lead screw 46 is accompanied by simultaneous lateral movement of torch 8 toward the left or toward the right in a direction substantially normal to arrow 50 and resulting from operation of motor 18. Thus, torch 8 moves in the direction of arrow 50 due to its structural connection with bracket 14 with lead screw 16 which is supported on frame 40 and movable therewith. Torch 8 moves transverse to weld seam 30 due to independent lateral movement of bracket 14 caused by rotation of lead screw 16. A suitable opening 72 is provided in the structure comprising frame 40 in order to permit the mentioned transverse movement of torch 8 relative thereto.

OPERATION

In using the apparatus described workpiece elements 26 and 28 are preplaced in the relationship suggested by FIG. 4 and held in such relationship by suitable clamps or holding means as suggested by vise jaws 64 and 68. Torch 8 is positioned over workpiece component 26 with a suitable arc gap and approximate one end of the members to be joined. The control circuit between sensors 20 and 22 and motor 18 is activated and the application of welding current to electrode 10 is started simultaneously with the operation of motor 48. As the welding arc is established between electrode 10 and the workpiece components, operation of motor 48 causes linear movement of torch 8 in the direction shown by arrow 50 in FIG. 3. Linear movement of the torch in the stated direction immediately results in misalignment of the torch relative to the contacting area between workpiece components 26 and 28, since the stated area is of a continuously curved sinusoidal form. The foregoing misalignment results in unequal fillet growth between fillets 5 and 6 shown, for example, in FIGS. 1a through 1c with a corresponding difference in the amount of heat radiated by each of the mentioned fillets on either side of vertical member 28. The stated difference in heat radiation is immediately sensed by elements 20 and 22, which do not move laterally with respect to the workpiece components. The unequal signals produced by the mentioned difference of fillet size and radiation intensity produced by misalignment of torch 8 relative to the contact area between workpiece components 26 and 28 causes operation of motor 18 in a direction whereby torch 8 is moved toward the side having the smallest fillet and least radiation intensity. The heat balance between the opposite sides of workpiece element 28 along the area of the weld seam 30 is thereby restored. As the torch 8 is continuously moved by operation of motor 48 along the welding path, sensors 20 and 22 provide continuous signals to correct misalignment of torch 8. Due to the rapid response of infrared heat sensors 20 and 22 and the close monitoring of the mentioned heat balance, extremely accurate correlation is obtained between the movement path of torch 8 and the contact area between workpiece elements 26 and 28 whereby precisely equal fillets 5 and 6 are obtained through the total length of weld seam 30 in the finished workpiece which is shown in plan view by FIG. 5.

CONTROL SYSTEM

The two infra-red sensors 20 and 22 convert the radiation from the drop through fillets to two individual electrical signals which are fed through summing resistors 112 and 114 to the input of an operational power amplifier 80. A zero balance signal and a negative feedback signal from the amplifier output are also fed through summing resistor 108 and feedback resistor 110 to the amplifier input. Any unbalance in the relative magnitudes of the sensor signals cause the operational power amplifier to produce either a positive or negative output voltage (proportional to the unbalance magnitude). This output signal is used to drive a reversible motor 18 which moves the weld torch 8 in a direction to minimize the heat unbalance between the two sensors. A power consisting of transformer 82, rectifier assembly 84 and filter capacitors 86 and 88 converts the input power to both positive (lead 90) and negative (lead 92) filtered d.c. power (for operational amplifier excitation for the motor). Dropping resistors 94 and 96 and zener diodes 98 and 100 supply positive and negative regulated d.c. power, respectively wires 102 (positive) and 104 (negative) for the sensors and for zero control 106. Individual adjustable sensor load resistors 116 and 118 are provided to balance and standardize the sensor outputs for sources with varying infra-red intensities. Zero center dc voltmeter 120 is provided both for system zeroing and to monitor drive motor 18 voltage. Drive motor 18 is a standard commercially available reversible dc motor. Controls are provided for adjustable zero balance, sensor gain, servo gain, maximum motor voltage limits, and position jog. Meters are provided for monitoring output voltage and sensor output voltage.

The details set forth above may be varied without departing from the scope of the invention concept as disclosed herein and defined by the following appended claims.

We claim:

1. A fusion welding tracking device which provides a balanced weld fillet along the length of contact between two workpieces to be joined, one workpiece thereof being positioned vertically adjacent to the under surface of the horizontal workpiece, said device comprises:
a heat source disposed above the upper surface of said horizontal workpiece and in substantial vertical alignment with said vertical workpiece;
a movable frame;
a first drive means operably connected to said movable frame for linear movement of said frame and said heat source along said workpieces;
a second drive means attached to said movable frame for lateral movement of said heat source during linear movement thereof;
heat sensing means disposed below said horizontal workpiece and positioned on both sides of said vertical workpiece, whereby said heat sensing means detects heat radiation from said weld fillet, said sensing means being operably connected to said second drive means for control thereof; and
support means for supporting said workpiece in a stationary manner below said heat source.

2. A fusion welding tracking device as recited in claim 1 wherein said heat sensing means comprises at least one pair of infrared sensors, each of said sensors being oppositely disposed to each other and positioned on opposite sides of said vertical workpiece, whereby said weld fillet is controlled in a balanced condition along the length of contact between said workpieces.

3. A fusion welding tracking device as recited in claim 2 wherein said vertical workpiece is provided along its length with a non-planar configurations.

4. A fusion welding tracking device as recited in claim 2 wherein said vertical workpiece is provided along its length with a sinusoidal configuration.

5. A fusion welding tracking device as recited in claim 2 wherein said heat source comprises a welding torch having an electrode positioned over said horizontal workpiece and in substantially vertical alignment with said vertical workpiece.

6. A fusion welding tracking device as recited in claim 2 including an operational power amplifier operably connected between said sensing means and second drive means for operable control thereof.

7. A fusion welding tracking device as recited in claim 5 wherein said first and second drive means respectively comprise first and second electric motors wherein said first motor is provided with a lead screw operably connected to said frame for linear movement thereof and wherein said second motor is provided with a lead screw operably connected to said heat source for lateral movement thereof.

8. A fusion welding tracking device in combination with two workpieces to be joined together by a weld fillet, said device providing an accurate tracking along an undulating weld joint comprising:
a first workpiece thereof being disposed in a horizontal position;
a second workpiece thereof being disposed vertically adjacent to the underside of said horizontal workpiece thereby forming a joint to be welded;
a heat source disposed above the upper surface of said horizontal workpiece and in substantial vertical alignment with said vertical workpiece;
a movable frame;
a first drive means operably connected to said movable frame for linear movement of said frame and said heat source along said workpieces;
a second drive means attached to said movable frame for lateral movement of said heat sources during linear movement thereof;
heat sensing means disposed below said horizontal workpiece and positioned on both sides of said vertical workpiece, whereby said heat sensing means detects heat radiation from said weld fillet, said sensing means being operably connected to said second drive means for operable control thereof, and whereby the tracking of said heat source is controlled for continuous alignment above said vertical workpiece.

9. A fusion welding tracking device as recited in claim 8 wherein said heat sensing means comprises at least one pair of infrared sensors, each of said sensors being oppositely disposed to each other and positioned on opposite sides of said vertical workpiece, and attached to said movable frame for linear movement therewith, whereby heat radiation is sensed on both sides of said vertical wall for tracking control of said lateral movement of said heat source.

10. A fusion welding tracking device as recited in claim 9 wherein said vertical workpiece is provided along its length with an undulating plane thereby providing a corresponding undulating weld joint.

11. A fusion welding tracking device as recited in claim 10 wherein said undulating plane comprises a sinusoidal configuration.

12. A fusion welding tracking device as recited in claim 10 wherein said undulating plane comprises a multiplicity of curvilinear configurations.

13. A fusion welding tracking device as recited in claim 10 wherein said heat source comprises a welding torch having an electrode positioned over said horizontal workpiece and in substantially vertical alignment with said vertical workpiece.

14. A fusion welding tracking device as recited in claim 10 including an operational power amplifier operably connected between said sensing means and second drive means for operable control thereof.

15. A fusion welding tracking device as recited in claim 10 wherein said first and second drive means comprises and electric motor wherein said first motor is provided with a lead screw operably connected to said frame for linear movement thereof and wherein said second motor is provided with a lead screw operably connected to said heat source for lateral movement thereof.

* * * * *